No. 866,858. PATENTED SEPT. 24, 1907.
W. A. HENDRYX.
APPARATUS FOR DEPOSITING METALS.
APPLICATION FILED JUNE 30, 1905.
4 SHEETS—SHEET 1.
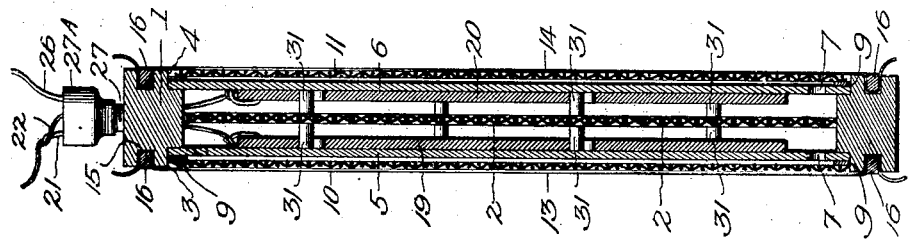
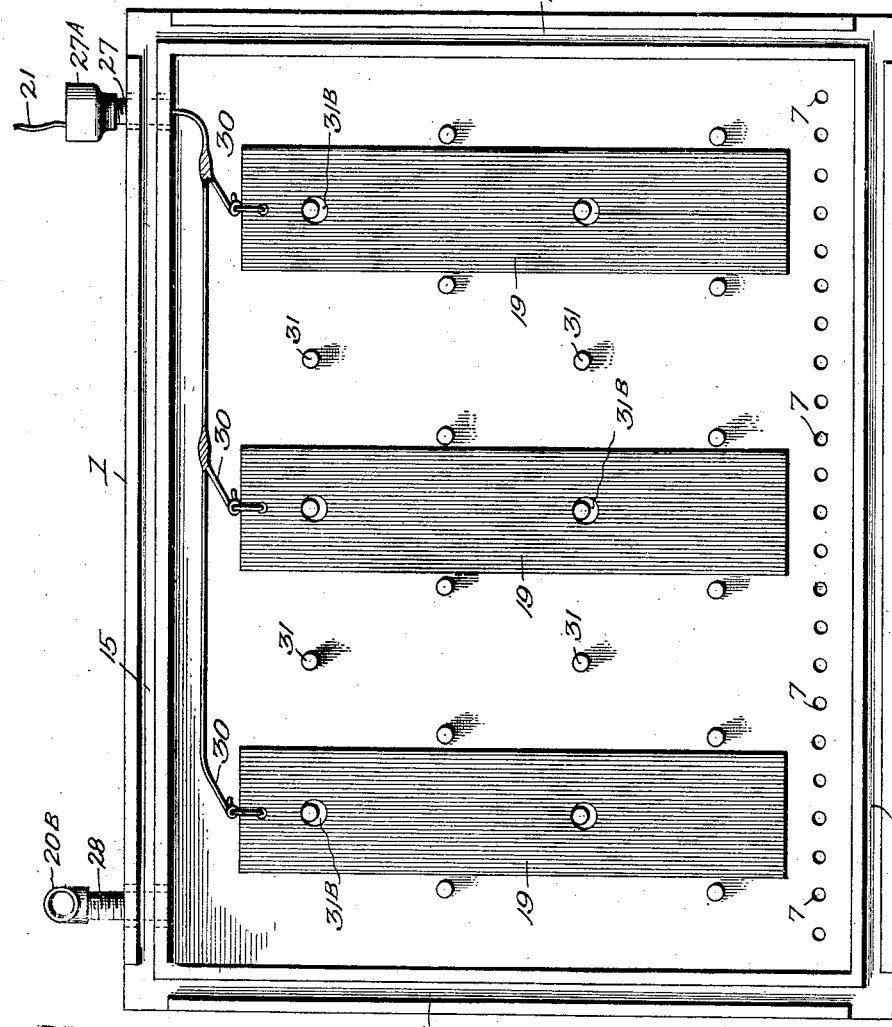
Witnesses: Inventor:
G. Sargent Elliott. By Wilbur A. Hendryx
Geo. E. Munson H. S. Bailey. Attorney.

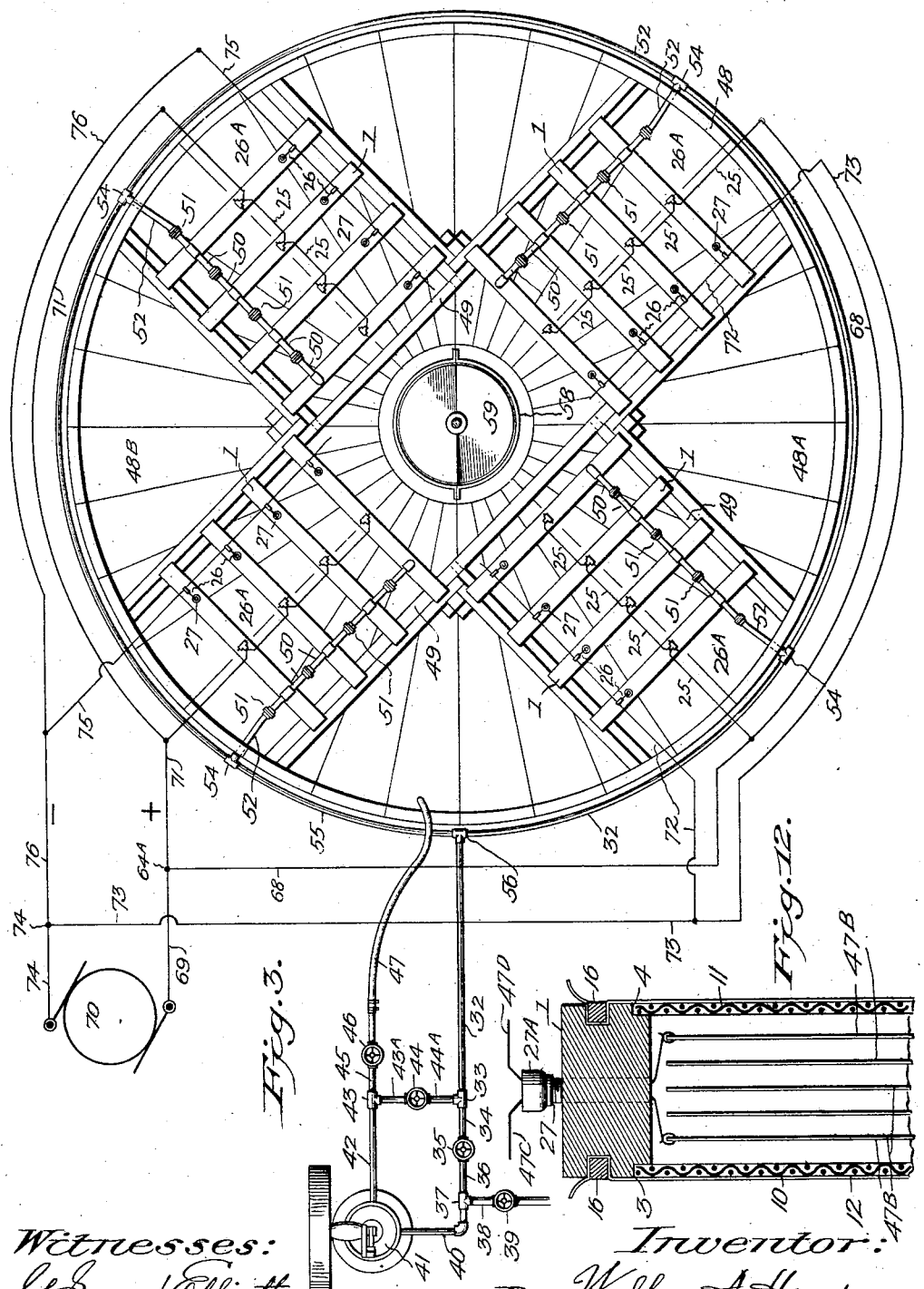

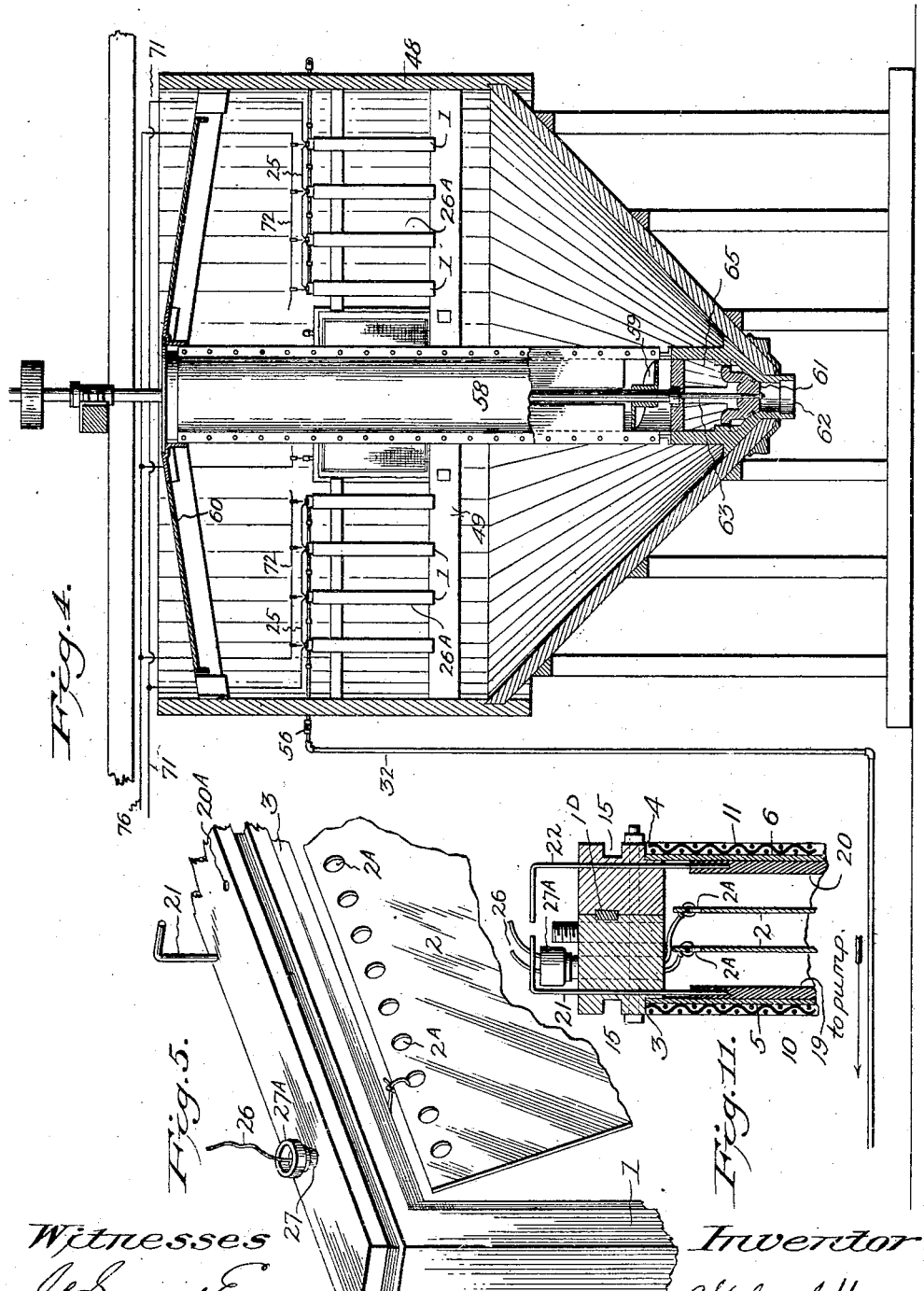

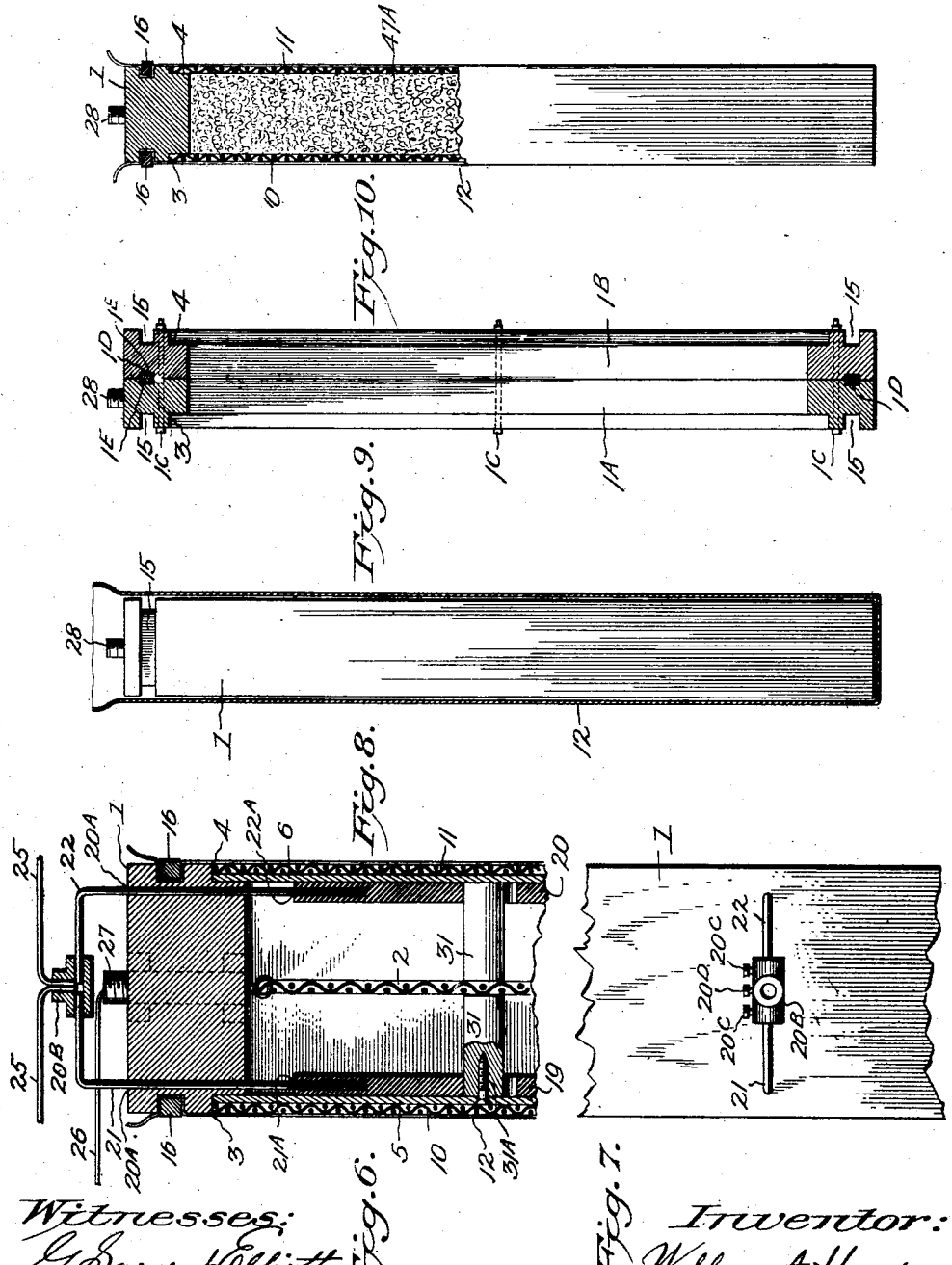

UNITED STATES PATENT OFFICE.

WILBUR A. HENDRYX, OF DENVER, COLORADO.

APPARATUS FOR DEPOSITING METALS.

No. 866,858.          Specification of Letters Patent.          Patented Sept. 24, 1907.

Application filed June 30, 1905. Serial No. 267,785.

*To all whom it may concern:*

Be it known that I, WILBUR A. HENDRYX, a citizen of the United States of America, residing at the city and county of Denver and State of Colorado, have invented a new and useful Apparatus for Depositing Metals, of which the following is a specification.

The object of this invention is to provide an apparatus for the separation of gold, silver, copper, and other metallic values from solutions containing the same, and more particularly from cyanid solutions of the precious metals. In the use of the apparatus the solutions are caused to pass through a filtering medium or envelop and into contact with metal-depositing means covered or enveloped thereby. The filtering medium serves to separate the finely divided ore, slime or other suspended matter, whereby a substantially clear metal-bearing solution is presented to the metal-depositing means. The metal-depositing means may comprise any relatively electro-positive metal, as zinc or any alloy or mechanical mixture containing the same, as specifically claimed in my co-pending application Serial No. 296,566, filed Jan. 7, 1906: or electrodes of any material adapted for connection with an external source of current as specifically claimed herein.

For a full understanding of my invention reference is made to the accompanying drawings wherein:

Figure 1 is an elevation of one form of precipitating cell in accordance with my invention, parts being removed; Fig. 2 is a transverse section of the same with the electrodes and filter in place; Fig. 3 is a plan view showing a plurality of cells in operative position in a tank; Fig. 4 is a vertical section of the tank, the cells being shown in position therein; Fig. 5 is a fragmentary perspective view of one form of cell with the filter and anodes removed; Fig. 6 is a transverse section of the upper portion of a cell having a central cathode; Fig. 7 is a fragmentary plan view of the same showing the electrical connections; Fig. 8 is an end view of a cell showing a sack filter in position to be secured thereto: Fig. 9 is a transverse section through a two-part cell; Fig. 10 is an end elevation, partly in the section, of a cell provided with a comminuted precipitating agent: Fig. 11 is a transverse section of the upper portion of a modified form of cell provided with two electrodes of each polarity, and Fig. 12 is a transverse section of the upper portion of a further modification having a plurality of electrodes electrically connected in series.

Similar reference characters refer to similar parts throughout the several views.

Referring to the drawings, 1 represents an open frame, preferably rectangular, although it may be made of other suitable form. This frame may be constructed of wood or other suitable material. Disposed within the frame are the metal-depositing means, which may comprise electrodes of opposite polarity adapted for connection to an external source of current, as hereinafter more fully described; or zinc or other relatively electropositive metal or an alloy or mechanical mixture containing the same, in which case connection to an external source of current is not necessary. The cathode may be centrally disposed within the frame as shown in Figs. 2, 5, 6. The cathode may comprise a thin sheet or plate of any suitable conductive material, as iron, lead, zinc or copper, as shown in Fig. 5: or I may use a perforated plate or conductive screen or mesh as illustrated in Figs. 2 and 6, this construction affording a somewhat increased area. In case a sheet-metal cathode is employed apertures $2^A$ are provided in its upper portion for circulation of the electrolyte, as shown in Fig. 5. When lead is employed it is conveniently used in sheet form, spread upon or secured to an iron plate, or preferably in form of an electrolytic deposit upon the iron.

In the inner edges of both sides of the frame, I form rabbeted steps, 3, and 4, and in these steps I place thin sheets or plates, 5 and 6, of any suitable material, such as asbestos, slate, wood-fiber, terra-cotta, burned clay, fire clay, or wood, but preferably use a plate composed of a compound of asbestos and Portland cement, mixed in such proportions as to make a very strong, thin plate, in which holes can be bored, and nails driven. These plates 5 and 6 I term solution guide plates. Along one edge of these plates, I form a row of holes, 7, and these plates are placed in the frame and rest against the inner faces of the steps with these holes at the lower portion of the frame. To the outside surface of these plates I secure several thin strips of wood or any other suitable material, 9, by nails or screws, but if preferred raised lugs or ribs may be molded on the outside of the plates when they are made. On top of these projecting ribs or strips of these two plates, I lay coarse wire screen plates, 10 and 11, the strips or ribs holding the screen out of contact with the surface of the plates. On these screens I lay a filtering medium, which may consist of sheets or plates of any suitable filtering material, such as asbestos, cloth, felt, plates of sandstone, porous terra-cotta, silicious compositions, or any other suitable fabric or material, but I preferably use either a canvas sack, 12, or sheets of canvas, 13 and 14. The coarse screens act as a supporting frame for the canvas, and with the raised ribs or strips on the solution guide plates, hold the canvas at a short distance away from their surfaces, and thus form a narrow solution flowing space between the solution guide plates and the filtering material or media 10 and 11. These filtering media can be used either in the form of sheets or plates, and may be secured to the frame in any suitable manner, but I preferably secure the canvas sheets by inserting their edges in grooves 15, which are formed in the opposite side edges of the frame, and wedge them in these grooves with wedge strips 16, that are made to be driven tightly into the recess when the edges of the canvas are laid in them. These wedging strips draw the canvas tight, secure it firmly, and they are easily and quickly removed. I preferably use, however, in place of canvas sheets, a canvas sack 17, which fits over the frame; in this case the grooves 15 are made around the top edge of the frame only, as shown in Fig. 8 and the sack is secured only at its top portion in these grooves by the wedges. To the inside surfaces of the frame of the solution guide plates, I secure by any suitable means, but preferably by screws or nails, anode plates, 19 and 20. These anode plates may be made of any suitable material, but I preferably use carbon anode plates, and preferably make them somewhat smaller in area than the solution guide plates. I connect to these anode plates one end of two circuit wires, 21 and 22, which extend out through an aperture formed in the top of the frame. These wires are connected to a single wire, 25, which extends to and is operatively connected to the positive pole of a suitable electric current generator. An electric current wire, 26, is also connected at one end to the cathode, and extends through the aperture with the anode wires, and extends to and is connected to the negative pole of the same current generator. A suitable supporting and guiding tube 27, is secured in the aperture through which the wires extend, and the wires extend through the tube, the space in the tube around the wires being filled with any suitable sealing material to make the aperture tight against leakage of the solution through the tube into the interior of the frame, such as paraffin, plaster of paris, or any other suitable material which can be easily removed when it is desired to take one side of the envelop apart to examine or remove the cathode. In order to form sufficient space around the wires to thoroughly seal them, I place a reducer, 27$^A$, on the end of the nipple.

Through the top of the frame, I form an aperture in which I screw a nipple 28. I preferably place this nipple on the opposite side of the edge of the top of the frame from the entrance tube of the circuit wires. Instead of employing one large plate anode, as shown in Fig. 8 I preferably use an anode in the form of a plate or bar, 29, and preferably use several bars, as shown in Fig. 1, although if desired a single plate of carbon can be used. To the top end of each of these bars 29, I connect a short wire 30, which is connected to one of the main wires 21 and 22, that extend into the frame.

In order to prevent the solution guide frame from collapsing, under the outside pressure due to the vacuum that is normally maintained within the envelop by the suction pump which I will describe hereinafter, and in order to hold the cathode between the anodes and support it vertically in the frame, I provide a plurality of braces 31, which I place at suitable distances apart between the inside surface of the solution guide plates and the opposite surfaces of the cathode, securing them to the solution guide frames with screws 31$^A$, as shown in Fig. 6, arranging those on the opposite sides of the cathode opposite each other, and I provide the carbon anode plates with apertures 31$^B$, through which the braces that come in line with them extend loosely, so that they will abut against each other with the cathode between them. To the nipple 28 I connect a hose or pipe 32, the opposite end of which is connected to a tee 33, to which a nipple 34 is connected, and to this nipple a valve 35 is connected, and at the side of this valve a nipple 36 is placed, which connects to one end of a tee, 37, in which a short nipple 38 is placed, to which a valve 39 is connected. To the opposite end of the tee 37 a nipple 40 is connected, which extends to the intake aperture of a vacuum pump 41. To the discharge outlet of the pump a pipe 42 is connected, that connects at one end to a tee 43, from which a nipple 43$^A$ extends and connects to a valve 44, from which a nipple 44$^A$ extends and connects to the tee 33, in the pipe 32. To the opposite end of the tee 43, I connect one end of a nipple 45, to the opposite end of which a valve 46 is connected, and to this valve I connect one end of a pipe 47, the opposite end of which extends back and discharges into the cyanid or other solution or pulp in the tank or box or receptacle in which the enveloped filtering anode and cathode is placed. Thus, in cyanid mills, the cyanid solution after treatment and separation from the ore in the large cyanid tanks by decantation or filtration could be run into suitable tanks or boxes, which could be equipped with my continuous metal-depositing means, and their gold and silver and other values separated from it and in the operation the solutions are sucked into the envelops in the presence of and in contact with the metal-depositing means through the filtering medium, by the pump, and as the clear solutions flow through the envelop and into contact with said depositing means, the gold and silver and other metallic values are deposited and the solution flows on to the pump 41, through the pipe, the valve 35 being open and the valves 39 and 44 being closed, and passing through the pump and pipe and valve 46, which is open through the pipe back to the solution holding tank or box. Thus, the ore pulp cyanid or other chemical solution is circulated in a continuous stream from the body of the ore pulp cyanid or other chemical ore pulp solution through my depositing device, and pipes and pump, back to and into the body of ore pulp cyanid or other chemical solution. As the solution is sucked through the filtering medium by the vacuum created by the pump, the very finely pulverized and comminuted ore commonly called slimes, which may not be fine enough to pass through sieves of from about 60 to about 250 or finer, mesh, is constantly attracted to and drawn against and is held against the surface of the filtering medium by the suction of the vacuum, and forms a cake on the surface of the filtering medium. As this cake if allowed to accumulate beyond a thickness of from about a half inch to an inch, impedes the flow of the solution through the filtering medium, it is necessary that it be removed from time to time, and I have adapted my pump and piping to do this very quickly, and thoroughly remove this cake, and at the same time without stopping the pump. In fact, it is necessary that the pump be kept running just the same as though it was creating a continuous vacuum in the envelop, and I remove the cake in such a manner that it instantly dissolves, dissipates, and mixes thoroughly again with the body of the cyanid or other chemical ore pulp, and I accomplish this by simply closing the valves 35 and 46 and opening the valves 39 and 44, and this permits the pump to pump and compress air through the valve 41 and pipe 42, and force it through the nipple 43$^A$ and valve 44 and nipple 44^A and pipe 32 back into the enveloped anode and cathode frame, and through the filtering medium or material on opposite sides of the frame and against the cakes, and blows them loose of the filtering medium, and they slide down and dissolve into the body of the ore pulp.

In Figs. 6 and 7, I illustrate a different method of securing the current wires to the anodes from that shown in Figs. 1 and 2, said change being a preferred arrangement of these connections where a canvas or other filtering material sack is used (see Fig. 8), in which the electrode supporting frame is placed instead of the sheets of canvas, as illustrated in Figs. 1 and 2. In this arrangement, the electric current conducting wires 21 and 22, are pieces of any suitable conductive wire, and they extend through holes 20^A formed through the top of the frame in which they fit snugly but removably, being tight enough to prevent leakage into the frame. The anode connecting ends of these wires are threaded and in the top edge of the anode frames threaded holes 21^A and 22^A are formed, which fit the threaded ends of the wires. The outer ends of these wires are bent at right angles, and extend into the opposite ends of a tee 20^B, to which they are secured by set-screws 20^C, which are threaded through the sides of the tee, and the general or single wire 25 from the generator enters the top aperture of the tee and is secured thereto by a set-screw 20^D, that is threaded in the side of the tee. To remove either one or both of these anodes, it is necessary only to loosen the set-screws and disconnect the tee from them, and then unscrew them from the anodes.

In Fig. 9, I illustrate a divided or separable anode and cathode and filtering material supporting frame. This frame is divided centrally so as to divide it into two parts or half frames, 1^A and 1^B. These two parts may be secured together by any suitable means, but I preferably bolt them together by a number of bolts 1^C, which are placed at suitable distances apart around the frame. A rubber washer or gasket 1^D, is inserted between the two parts of the frame, in a groove 1^E, which is formed partially in the meeting surfaces of each half. This gasket is arranged to be clamped tight enough between these two frames to prevent leakage of ore pulp solutions into the interior of the frame, when its two parts are tightly secured together. I do not illustrate a cathode or anode in this frame, but they can be inserted and secured in this divided frame in a similar manner as in the frame shown in Figs. 1, 2, and 6; that is, by being held between the ends of the lateral braces; or they may be held in any other desired order or arrangement.

In Fig. 10, I illustrate an enveloped electrode that is a modification of the electrodes illustrated in the other views of the drawings. In this modification, the frame and filtering sack and its supporting frame, are the same as in the other views, but the solution guide plates are preferably omitted, although they may be used if desired. The anodes and the cathode and their current wires and the generator, are also preferably omitted, but these also may be retained and used if desired. I have illustrated this arrangement without these elements, and the entire space within the frame between the screens of the filtering material, is filled with zinc shavings 47^A, or equivalent material as hereinbefore set forth, capable of separating the metal from solutions such as have been described. In case the solution guide plates and the anodes and cathode and the current wires and the generator are used, however, the zinc shavings can be packed in between the anodes and cathodes without interfering with their electrical action, provided care be taken to avoid a short circuit. In either case the solution outlet nipple and the system of piping and the pump for drawing the solution through the filter into the frame, and returning it, and for forcing the slimes cake from the filtering medium at intervals, are used, and the solutions are sucked through the zinc shavings to the pump, and are forced back again to their source of supply, and the pump is manipulated to compress air and force such solutions and compressed air back through the zinc and filtering medium into the supply of solution the electrode is immersed in.

In Fig. 11, I illustrate a divided two part or halved frame, in which two cathodes are placed, and each cathode has an anode between it and its adjacent filtering medium. The solution outlet nipple is preferably placed between the cathodes, in one of the half parts of the frame.

In Fig. 12, I illustrate my enveloped solution filtering and circulating and slimes removing electrode, arranged in series. In this arrangement, the plates 47^B, may consist of any suitable material, and one side of each plate facing the positive current wire 47^C, is an anode, and the opposite side of each plate from the positive side and facing the negative-current wire 47^D, is a cathode. Consequently, it does not make any difference what the plates in this arrangement are made of, as they can all be carbon, iron, zinc, lead, copper, or any other suitable material. The side of each plate that faces the positive current wire will be an anode, and the opposite of each plate will be a cathode. The construction of the frame and filtering medium are the same as in the other views, but an integral or a divided two part frame can be used as desired.

My metal-depositing device is especially adapted for use in the apparatus for which Letters Patent of the United States No. 785,214, were issued to me March 21st, 1905, or in the process described in my co-pending application No. 225,246; and in Figs. 3 and 4, I illustrate my improved envelop operatively arranged in my apparatus for extracting metals from their ores, and in using my metal-depositing cells, I preferably employ a number or series of them grouped together in groups 26^A, as illustrated in Fig. 3, and preferably place several groups in each agitating tank 48, preferably using four groups as shown. Each group of envelops is supported on a frame of timbers 49, which is built in the tank and forms a supporting staging for the groups of anodes. Each group may consist of any desired number of envelops, and each envelop is connected with the envelop on either side, by nipples 50, which are connected by unions 51, the union in each group adjacent to the side of the tank connecting with a short pipe 52, which projects through the shell of the tank. A hose may be used if desired in place of the pipe and hose coupling in place of the unions. There are consequently four groups of envelops shown in Fig. 3, and four of the pipes 52, and the outer ends of these four pipes connect to four tees 54, which are inserted in a hoop shaped pipe 55, which is curved around the tank, and at one point contains a tee 56, to which one end of the pipe 32 is connected, the opposite end of which extends to the tee of the pump's system of pipe connections and valves, as above enumerated, to operate the enveloped electrodes, and to return the clear solution to the tank, and to from time to time remove the cake of slimes from the filtering material. The tank 48 illustrated in Figs. 3 and 4, is the agitating tank shown in my patent and application above referred to, and the group of envelops are supported in it.

As the electro-cyanid process I employ for extracting the gold and silver and other values from ores, requires fine grinding, and the finer the better, as the gold and silver and other metallic values are thereby more thoroughly freed, and also places them in condition to be more fully and thoroughly acted on by the cyanid solutions electrolytically, and as this fine pulverizing and grinding of the cyanid ore pulp makes fine slimes, and as in some ores where bare cathodes are exposed in the cyanid ore pulp solutions, as in my patent and process above referred to, it was found that the very fine slimes of some ores coated the cathode, and slowly but continuously lessened and hindered the recovery of the values of the solution as the slimes accumulated on the cathode, which necessitated frequent removal of the cathodes and the cleaning of them in order to thoroughly extract the values in a reasonable time, it is to obviate this objectionable feature principally that I have invented my enveloped depositing cell, and in order to facilitate the flow of the cyanid ore pulp solution to them, I employ the vacuum suction and pump and return the solution to the tank, thus causing it to flow in a continuous stream through the depositing cell back to the tank. The solution that is drawn through the filtering medium is very clear, and entirely free from the finest slimes of the ore pulp.

In the tank 48, the numeral 58 designates a central pump casing, in which a propeller pump 59 is rotatably mounted; at the top of the pump casing a conical deflector 60 is placed and at the bottom of the casing a valve 61 and a discharge outlet 62 are placed. A valve stem 63 is connected to the valve, and extends loosely up through and above the pump shaft, and contains a hand wheel at its top, (not shown) by which the valve is operated, and just above the valve at the bottom of the casing apertures 65 are formed in the casing. The body of the tank is filled with cyanid or other chemical ore pulp, which enters the apertures in the pump casing, and fills it to its level in the tank. The pump is rotated by any suitable power operatively connected to it, and the ore pulp is drawn into the bottom of the pump casing and is lifted or pumped up through the casing, and discharged on top of the conical distributer, over which it flows, in contact with the atmosphere, and from the circumferential edge of which it drops into the body of ore pulp in the tank, which is constantly flowing downward and being pumped or lifted up through the pump casing. My filtering cells 26$^A$, in groups, are completely submerged in the cyanid or other chemical ore pulp solution of the tank, as shown in Fig. 4. I preferably connect each group of enveloped electrodes to the generator in the following manner: on one side 48$^A$ of the tank I place two groups of electrodes, and connect the anodes of each group together by a wire 68, which connects to the wires 25, which extend from one anode to the other and that connect to the anode wires 21 and 22, in the tee 20$^B$. The wire 68 then extends to and connects to the wire 69, which extends to and connects to the positive pole of the generator 70. On the opposite side of the tank, I connect the two opposite groups of electrodes together by a wire 71, which is connected to the anode wires 21 and 22 and their connecting tee 20$^B$ and their connecting wires 25. This wire 71 extends to and is connected to the end of the generator wire 69, the three wires 68, 71, and 69 being preferably connected together at 69$^A$. All of the cathode wires 26 of the two groups of electrodes on the side 48$^A$ of the tank, are connected to a wire 72, which connects to a wire 73, that extends to and connects to a wire 74, that extends to and connects to the negative pole of the generator 70. The cathode wires 26 of the two groups of electrodes on the side 48$^B$ of the tank, are connected to wires 75, which are connected to a wire 76 that extends to and connects to the generator wire 74, the three wires 73, 74, and 76 meeting together at the point 74$^A$. A current supply of from about .05 to 2 amperes with a potential difference of from about 7 to 10 volts, is used for the electrolytic recovery of the metallic values of most ores.

As the ore pulp solution flows downward through the body of the tanks, it flows down between the enveloped electrodes, and the solution is sucked through the canvas or other suitable filtering medium from both sides of the envelop frame against the surface of the solution guide plates, and flows through the perforations in the bottom of them up alongside of and between the anodes on the opposite sides of the envelop and the cathode in the center of it, and is sucked out of the envelop to the pump as above described, and forced back to the tank, and the slimes are drawn to and stick on and accumulate on the surface of the canvas or other filtering medium used, but are blown off from time to time, but in the moving ore pulp solution, they are almost instantly dissipated and mix with the endless flowing stream of ore pulp.

My invention enables me to deposit the gold and silver and other metallic values in a very pure clear form, as a hard plate or as a sub-oxid of the metals deposited. In either case the metals are easily removed from the cathodes. My invention also enables me to recover a very large percentage of the precious and other metals from cyanid or other chemical ore pulp solutions, in a period of time of from about five to twelve hours.

My invention contemplates any and all arrangements of electrolytic anodes and cathodes or other metal-depositing means, and of making anodes and cathodes in any suitable operative forms, or arrangements, and the use of anodes and cathodes composed of any suitable metals, materials, compositions, compounds, or alloys, and of enveloping, inclosing, incasing, surrounding, or covering them in any manner or order of arrangement in any suitable filtering material or medium, and of circulating cyanid or other chemical ore pulp solutions through them and back to their source of supply, by any suitable means, and of removing the ore pulp or slimes cake from the outer surface of the filtering material or medium, at predetermined periods of time, during the electrolytic deposition of the gold, silver, and other metals from the ore pulp solutions on the cathodes of the electrode.

Having described my invention, what I claim as new and desire to secure by Letters Patent, is:

1. A depositing cell comprising a filtering medium and metal depositing means, said filtering medium being adapted to permit the ready detachment of solid matter accumulating thereon, substantially as described.

2. A depositing cell comprising a filtering medium and metal depositing means, and means for passing a metal bearing solution through said filtering medium and into contact with said depositing means, said filtering medium being adapted to permit the ready detachment of solid matter accumulating thereon, substantially as described.

3. A depositing cell comprising a filtering medium and metal depositing means, and means for passing a metal bearing solution successively through said filtering medium and depositing means, said filtering medium being adapted to permit the ready detachment of solid matter accumulating thereon, substantially as described.

4. A depositing cell comprising a filtering medium, a support therefor, and metal depositing means, said filtering medium being adapted to permit the ready detachment of solid matter accumulating thereon, substantially as described.

5. A depositing cell comprising an open frame, a filtering medium carried thereby, and metal depositing means within said frame, substantially as described.

6. A depositing cell comprising metal depositing means, and a filtering medium arranged to cover the same and adapted to permit the ready detachment of solid matter accumulating thereon, substantially as described.

7. A depositing cell comprising metal depositing means, and a filtering medium arranged to envelop the same and adapted to permit the ready detachment of solid matter accumulating thereon, substantially as described.

8. A depositing cell comprising an open frame, supporting means carried thereby, a filtering medium disposed upon said supporting means, and metal depositing means within said frame, substantially as described.

9. In apparatus for recovering metals, a tank, and a depositing cell therein, said cell comprising metal depositing means and a filtering medium, substantially as described.

10. In apparatus for recovering metals, a tank, and a plurality of depositing cells therein, each of said cells comprising metal depositing means and a filtering medium, substantially as described.

11. A depositing cell comprising a filtering medium and electrodes adapted for connection to an external source of current, said filtering medium being adapted to permit the ready detachment of solid matter accumulating thereon, substantially as described.

12. A depositing cell comprising a filtering medium and electrodes adapted for connection to an external source of current, and means for passing a metal bearing solution successively through said filtering medium and metal depositing means, said filtering medium being adapted to permit the ready detachment of solid matter accumulating thereon, substantially as described.

13. A depositing cell comprising electrodes adapted for connection to an external source of current, and a filtering medium arranged to cover the same and adapted to permit the ready detachment of solid matter accumulating thereon, substantially as described.

14. A depositing cell comprising an open frame, supporting means carried thereby, a filtering medium disposed upon said supporting means, and electrodes adapted for connection to an external source of current within said frame, substantially as described.

15. In apparatus for recovering metals, a tank and a depositing cell therein, said cell comprising electrodes adapted for connection to an external source of current and a filtering medium, substantially as described.

16. In apparatus for recovering metals, a tank, a plurality of depositing cells in position to be submerged in the material in said tank, each cell comprising metal depositing means and a filtering medium, and means for withdrawing the metal bearing solution from said tank through said cells, substantially as described.

In testimony whereof I affix my signature in presence of two witnesses.

WILBUR A. HENDRYX.

Witnesses:
  G. SARGENT ELLIOTT,
  SARAH L. BOOTH.